(12) United States Patent
Huebner et al.

(10) Patent No.: US 7,404,598 B2
(45) Date of Patent: Jul. 29, 2008

(54) VEHICLE ROOF

(75) Inventors: Roland Huebner, Munich (DE);
Friedhelm Wulf, Adelsdorf-Aisch (DE);
Martin Pollak, Puchheim (DE); Ralf Schwaighofer, Neubeuem (DE); Rudolf Muttenhammer, Germering (DE);
Andreas Lang, Oiching (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/569,634

(22) PCT Filed: May 19, 2005

(86) PCT No.: PCT/EP2005/005439

§ 371 (c)(1),
(2), (4) Date: Nov. 27, 2006

(87) PCT Pub. No.: WO2005/115782

PCT Pub. Date: Dec. 8, 2005

(65) Prior Publication Data

US 2007/0246973 A1    Oct. 25, 2007

(30) Foreign Application Priority Data

May 25, 2004    (DE)    ............ 10 2004 025 548

(51) Int. Cl.
*B60J 7/04*    (2006.01)

(52) U.S. Cl. .................................. 296/216.09

(58) Field of Classification Search ............ 296/216.06, 296/216.09

See application file for complete search history.

(56) References Cited

U.S. PATENT DOCUMENTS

| | | | |
|---|---|---|---|
| 5,213,626 A | | 5/1993 | Paetz |
| 6,244,653 B1 * | | 6/2001 | Nishio et al. ............ 296/216.09 |
| 6,273,500 B1 * | | 8/2001 | Boersma et al. ......... 296/216.09 |
| 6,461,704 B1 * | | 10/2002 | Matsco et al. .................. 428/38 |
| 6,540,289 B2 * | | 4/2003 | Bergmiller et al. ...... 296/216.09 |
| 6,666,571 B2 | | 12/2003 | Becher et al. |
| 6,908,147 B2 | | 6/2005 | Teschner |
| 2002/0113466 A1 | | 8/2002 | Bohm et al. |
| 2003/0026105 A1 * | | 2/2003 | Becher et al. ................ 362/490 |
| 2003/0137166 A1 * | | 7/2003 | Tamura et al. ......... 296/216.09 |

* cited by examiner

*Primary Examiner*—Dennis H Pedder
(74) *Attorney, Agent, or Firm*—David S. Safran

(57) ABSTRACT

In a motor vehicle with a roof opening (12) located in a fixed roof surface (10) and a cover (13) for closing the roof opening, the cover has an at least partially transparent pane (14) and a frame which is connected to the pane and which extends over at least one part of the edge of the pane. The pane (14) is a plastic pane and the frame is formed by in situ foaming (20) of a foam material onto the periphery of the pane, the shape of the pane, in at least one partial area of a connecting region between the pane and the peripheral foam, is configured such that a permanent mechanical, positive interlocking connection is created between the pane and the peripheral foam.

22 Claims, 4 Drawing Sheets

VEHICLE ROOF

BACKGROUND OF THE INVENTION

1. Field of the Invention

This invention relates to a motor vehicle roof with a roof opening located in a fixed roof surface and a cover for closing the roof opening, the cover comprising at least one partially transparent pane and a frame which is connected to the pane and which extends over at least one part of the edge of the pane.

2. Description of Related Art

In these motor vehicles roofs, which can be roofs with a fixed or movable cover, the pane is conventionally a glass pane which is connected by means of a peripheral frame to the motor vehicle roof itself or to a positioning mechanism for positioning the cover. The frame can, moreover, be formed by foaming the pane in place, into which cover a metallic reinforcing or holding frame, for example, inner metal cover sheet, is inserted.

Aside from the glass elements, plastic panes which are cemented to a frame surrounding the pane are furthermore used in vehicle construction, especially for fixed elements.

While glass panes are advantageous in that they can be more easily worked, especially using techniques of foaming in place, it is however disadvantageous that glass covers have considerable inherent weight; this is disadvantageous not only with respect to the total weight of a roof structure, but especially when the cover is a movable cover which then requires a more complex configuration of the components supporting the cover and of the drive of the cover.

Plastic covers are lighter than glass covers, but much more difficult to install than the latter. This is due to the fact that the plastics used for producing vehicle roof covers generally have coefficients of thermal expansion which are very different from those of the metallic reinforcing and holding frame, and therefore, require corresponding movable connections between the pane and the frame, as is explained, for example, in German Patent DE 101 08 527 and corresponding U.S. Patent Application Publication 2002/0113466.

Instead of a corresponding movable mechanical connection, the attempt was made to connect the plastic cover by means of a material connection to the respective frame. For plastic covers using conventional materials, such as polycarbonates, to achieve the stability and durability of the cover required in motor vehicle construction, additional layers of hard material are applied to the outside and inside of the cover and are generally detrimental to a connection to other materials. As a result, the foaming-in-place processes used for glass covers to date are not applicable to plastic covers, and when a plastic cover is cemented to the frame, especially due to the aforementioned major differences with respect to coefficients of thermal expansion, faults and breaks in the cement often occur.

SUMMARY OF THE INVENTION

In view of the aforementioned problems, a primary object of the present invention is to devise a motor vehicle roof of the initially mentioned type which, on the one hand, has a low total weight and is still stable and easy to produce.

This object is achieved in accordance with this invention in that, in a motor vehicle roof of the initially mentioned type, the pane is a plastic pane and the frame is formed by foaming the pane in place, the shape of the pane, in at least one partial area of the connecting region between the pane and the peripheral foam, being chosen such that provision is made for a permanent mechanical connection between the pane and the peripheral foam by means of a positive interlocking connection. In this way, the advantages of easier workability of glass covers can be combined with those of the lower weight of plastic roofs, as a result of the positive interconnection between the plastic pane and the peripheral foam, provision having been made for a permanent, reliable connection between the pane and peripheral foam which does not degrade due to external effects and especially thermal influences.

The positive interlocking provides for a permanent mechanical connection between the plastic pane and the peripheral foam under all operating conditions of the motor vehicle roof. Furthermore, since positive interlocking between the pane and peripheral foam arises from the shape of the pane itself, no additional production or installation steps are necessary to join the pane to the peripheral foam. Rather, the shape elements which provide for the positive interlocking between the pane and peripheral foam are molded integrally to the pane directly as the pane is molded. Then, if the correspondingly molded pane is placed in the foaming-in-place tool and is foamed in place, the peripheral foam material fills the corresponding shape elements and thus provides for positive interlocking between the pane and the peripheral foam.

In particular, the pane can have at least one recess engaged by the peripheral foam. Preferably, in this connection, the shape of the recess is chosen such that the peripheral foam extends behind it. These recesses can be provided in the edge area of the pane on its top and/or bottom and on the face. Furthermore, in this connection, it can be a series of individual recesses or one groove which runs along at least one region of the side edge.

Furthermore, the pane can have at least one elevation or a projection which is embedded in the peripheral foam. Preferably, the shape of the projection is chosen such that the peripheral foam extends behind it. This can be accomplished, for example, in that an essentially L-shaped or T-shaped projection is molded onto the pane which, when it is embedded in the peripheral foam, prevents not only displacement between the pane and the peripheral foam, but also prevents the pane and peripheral foam from moving away from one another.

In another version of the invention, the pane can have an undercut along at least part of its side edge, behind which the peripheral foam extends. This can be accomplished, for example, in that the pane has a recess or a groove along its side edge which is filled with foam material when the pane is foamed in place.

Additionally, along at least part of its side edge, the pane can be encompassed by the peripheral foam; in this case, the pane preferably has a reduced cross section in the part of its side edge encompassed by the peripheral foam, so that a flush roof surface can also be accomplished in the region of the peripheral foam. To reduce the cross section, the pane can have a chamfer, depression and/or a bevel in the part of its side edge in which it is encompassed by the peripheral foam.

It goes without saying that the aforementioned measures can all be combined with one another in any manner, the shaping of the pane which provides for a permanent mechanical connection between the pane and the peripheral foam by means of a positive interlocking connection being provided either in several individual regions of the pane, or it can be made as a geometry which extends essentially over the entire side edge region of the pane.

In another version of the invention, the pane can have an essentially transparent inner region and an essentially opaque edge area so that the areas of the pane in which the mounting elements of the pane are located are covered as seen from the outside and a uniform appearance of the pane results. The opaque edge area can be made, for example, as a blackened region or as a region which is matched in color to the roof surface.

Preferably in this connection, the essentially opaque edge area is molded integrally to the essentially transparent inner region. In particular, the pane can be formed as an essentially transparent pane onto the edge area of which a layer of essentially opaque plastic is molded in one piece. In this connection, the transparent pane can be made such that it essentially completely spans the roof opening, a layer of essentially opaque plastic being molded onto the bottom of the transparent pane. Specifically, the pane can be produced from an essentially transparent polycarbonate material onto the edge area of which a layer of, for example, black polycarbonate material which is essentially opaque is molded in one piece. While it would be fundamentally possible to color the edge area of the transparent plastic pane, for example, by applying a layer of paint, for stability reasons it is preferred that the pane be produced in a two-step production process in which, in a first working step, the actual pane is produced from a transparent material onto the edge area of which, then, an essentially identical, but differently colored material is molded, so that a uniform part results which, with respect to its stability and further workability, is equal to a pane produced from only one material.

As in known, plastic panes used in motor vehicle construction can be provided on its outer side, preferably also on its inner side, with an additional layer of hard material, for example, of polysiloxane in order to increase the abrasion and scratch resistance of the pane. Depending on the choice of the materials used, in this connection, the hard material layer can optionally also be used as an adhesive between the plastic pane and the peripheral foam.

Furthermore, a reinforcing frame, for example, an inside metal cover sheet, can be inserted into the peripheral foam, and in this connection, the outside edge of the inside metal cover sheet can be embedded in the peripheral foam, while the inside edge of the inside metal cover sheet rests against the bottom of the pane. In order to preclude creaking or rattling of the free inner edge of the inside metal cover sheet against the bottom of the pane, between the inner edge area of the inside metal cover sheet and the pane there can be a damping layer, for example, of a rubber, microcellular rubber or textile layer which is applied to the inside metal cover sheet by cementing or by dry coating.

If other attachments of metal or plastic are to be fastened to the cover, such as for example, screens, seals, antennas, cable channels, shade guides, drive cables or the like, they can be embedded directly in the peripheral foam. Alternatively or in addition, holding devices, such as threaded bushings, sleeves, retaining clips and other inserts for mounting these attachments can be embedded directly into the peripheral foam, or recesses for mounting of these attachments can be molded directly into the peripheral foam. If these attachments or holding devices for attachments are embedded in the peripheral foam, they can be inserted directly into the foaming tool during foaming and thus embedded in the peripheral foam.

The peripheral foam can be made from a polyurethane material in the known manner.

Preferred embodiments of the invention are detailed below with reference to the drawings.

DETAILED DESCRIPTION OF THE INVENTION

Figure 1:
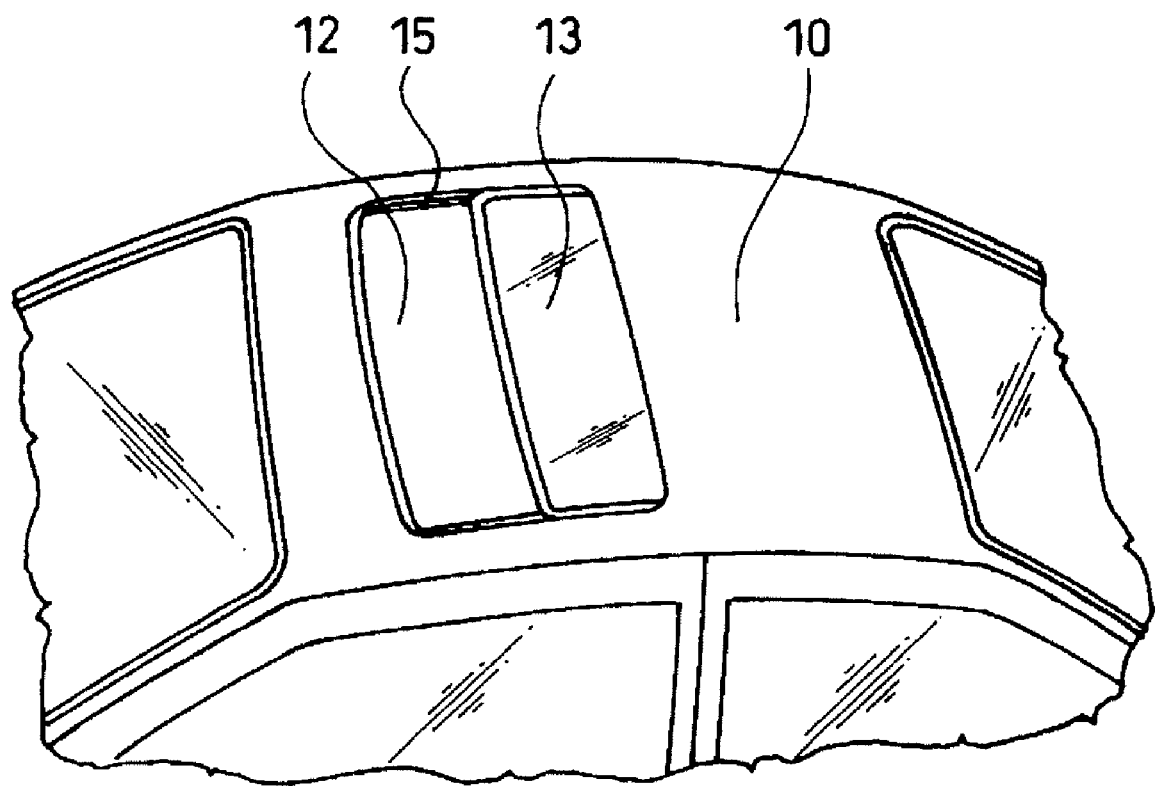
FIG. 1 is a schematic view of the upper portion a vehicle.

The vehicle shown in FIG. 1 has a roof opening 12 in a fixed roof surface 10. To close the roof opening, there is a cover 13 which, in the illustrated embodiment, can move along a roof-mounted frame 15. This invention is used especially on roofs with fixed elements, on sliding roofs, sliding and raising roofs, spoiler roofs, externally guided sliding roofs and the like.

Figure 2:
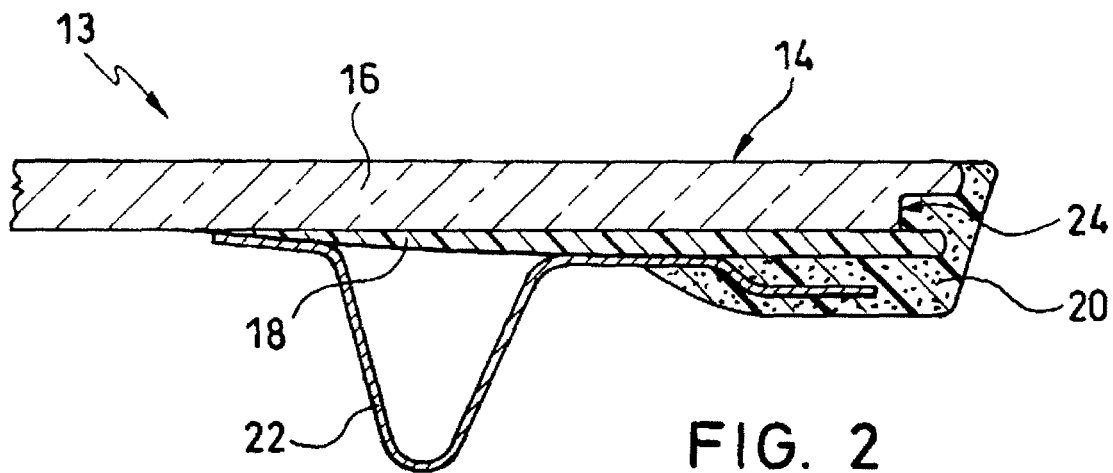
FIG. 2 is a sectional view of the side edge area of the cover of the motor vehicle roof shown in FIG. 1.

FIG. 2 shows the cover 13 from FIG. 1 in the area of its side edge. The pane 14, which covers the roof opening and which forms the actual cover, is formed of a transparent pane 16 which is made, for example, from transparent polycarbonate to which a strip 18 of nontransparent material, for example, black polycarbonate, is molded in one piece on its bottom. This pane can be produced by means of a two-stage molding process in which, for example, first a transparent material is placed in a corresponding molding tool, to which a layer of essentially the same, but differently colored material is then molded in a second step so that a one-piece pane of uniform material results. In its edge area, the pane 14 is foamed in place with peripheral foam 20, for example, of a polyurethane material, the peripheral foam preferably peripherally surrounding the entire edge area of the pane 14.

To support the pane 14 and to move it on a roof mechanisms (not shown), there is a frame which can be the inside metal cover sheet 22 as shown in FIG. 2, which is inserted into the foaming-in-place tool at the same time, preferably when the pane 14 is being foamed in place. In this way, the inside metal cover sheet 22 can be connected to the pane 14 by means of the peripheral foam 20 without other production or mounting steps being necessary for this purpose.

In the embodiment shown in FIG. 2, a positive interlocking connection between the pane 14 and the peripheral foam 20 is established by a chamfer 24 being provided on the transparent part 16 of the pane 14 along its lower edge side, so that after molding the opaque region 18 onto the transparent pane 16, a groove is formed in the side edge of the pane 14, preferably a peripheral groove, which fills with foam material when the pane 14 is being foamed in place. Analogously to the undercut of the pane 14 shown here, the pane could also have a groove in its transparent part 16, or a groove which extends both into the transparent part 16 and also the nontransparent part 18. In any case, the positive locking between the pane 14 and the peripheral foam 20 produces a strong mechanical link of the pane 14 to the peripheral foam 20 which effectively opposes detachment of the pane from the peripheral foam due to high mechanical or thermal stress.

Figure 3:
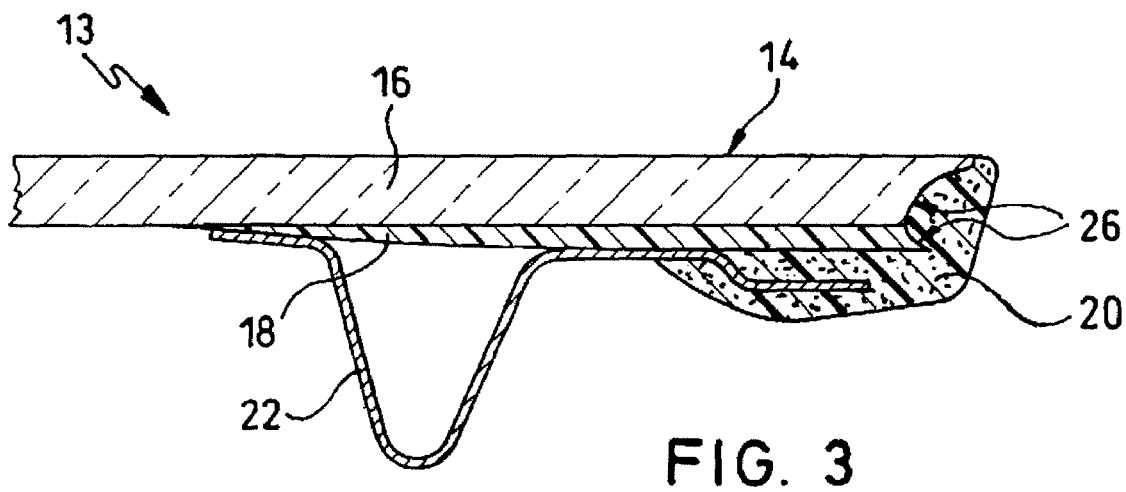
FIGS. 3 to 7 are views similar to FIG. 2 of modified embodiments of the cover.

FIG. 3 shows a modified embodiment of the cover 13 according to FIG. 2. Here, the pane 14 which has been formed from the transparent pane 16 and the opaque region 18 has a peripheral indentation 26 along its side edge which is filled with the foam material of the peripheral foam 20.

Figure 4:
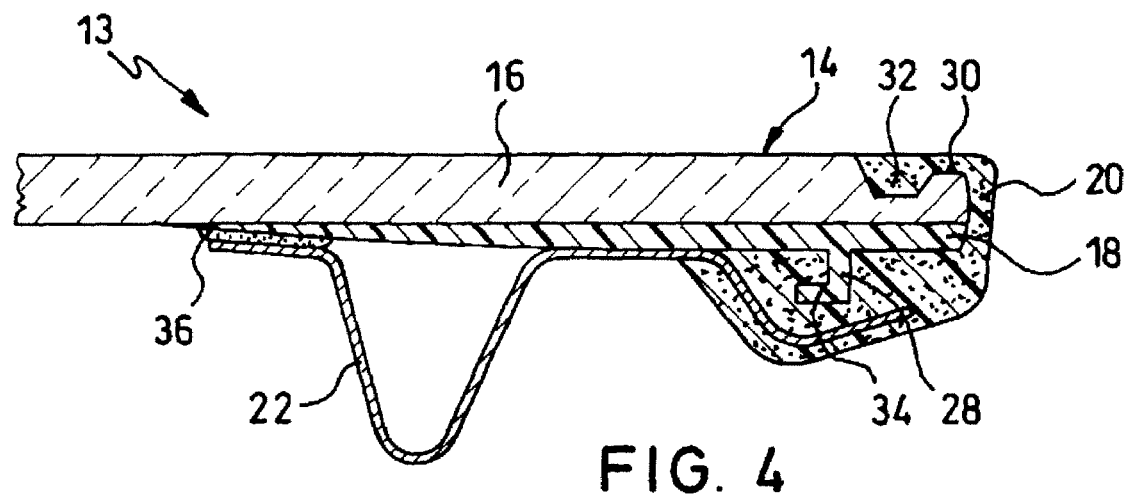

In the embodiment of the cover 13 in accordance with the invention, as shown in FIG. 4, the pane 14 which is formed from the transparent plastic pane 16 and the opaque plastic region 18 molded to it in one piece has an edge area 30 with a reduced thickness. In addition, there is a recess 32 in the region with the reduced thickness 30 at a distance from the outside edge of the pane. The outside edge of the pane 14 is foamed in place with polyurethane material, the peripheral foam 20 surrounding the region with the reduced thickness 30 such that the top of the peripheral foam 20 runs flush with the top of the pane 14.

Furthermore, FIG. 4 shows a configuration of the pane 14 in which there is a projection 28 which extends down on its bottom and from which another projection 34 extends laterally, so that altogether a generally L-shaped projection is formed which is positioned in the foam tool such that the projection becomes embedded in the peripheral foam. As in the preceding embodiments, in the embodiment as shown in FIG. 4, the pane 14 can also be made such that there are shaping features which provide for positive interlocking with the peripheral foam 20, here especially, the recess 32 and the L-shaped projection 28, 34, in partial regions of the pane, or extending along the entire periphery of the pane.

Furthermore, the outside edge of the inside metal cover sheet 22 is embedded in the peripheral foam 20 so that the inside edge of the sheet metal rests against the underside of the pane 14. In order to hide the inside metal cover sheet 22 from view from above, the region 18 of the pane produced from the opaque plastic extends just beyond the inside edge of the inside metal cover sheet 22. Between the inside edge of the inside metal cover sheet 22 and the pane 14 there can also be a damping component 36 which prevents rattling or creaking which could be caused by relative motion between the pane and the inside metal cover sheet. This damping component 36 is preferably an elastic material applied to the top of the inside metal cover sheet 22, for example, of rubber, microcellular rubber or textile materials, for example, dry coating of the top of the inside metal cover sheet 22.

Figure 5:
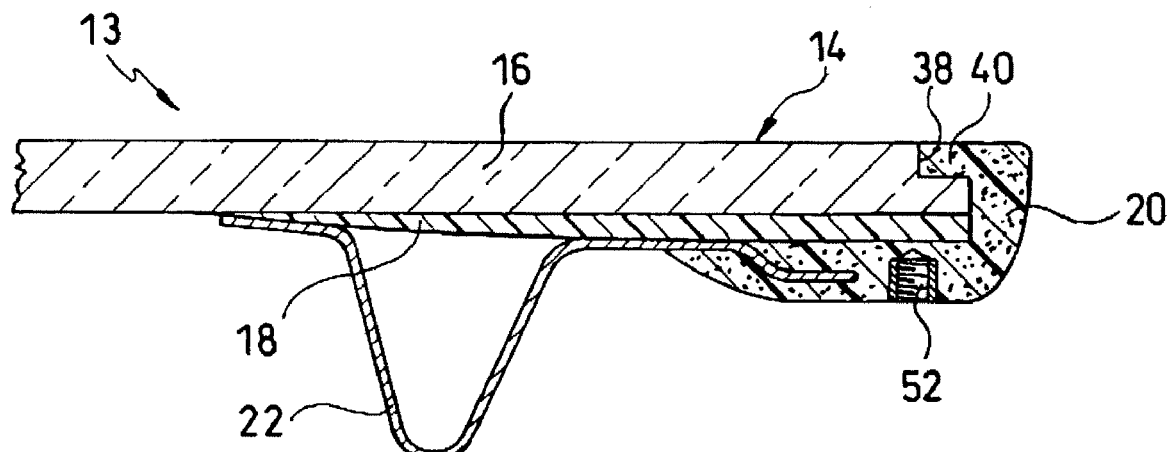

FIG. 5 shows another embodiment of a cover 13 in which the outside edge of the pane 14 is encompassed by the peripheral foam 20. In order to provide space for the peripheral foam 20 around the edge, and still for an altogether flush surface of the cover 13, along the outside edge of the pane 14 in its transparent part 16 there is a chamfer 38 which is filled with foam material 40 when the pane 14 is foamed in place. If additional attachments such as, for example, screens or shade guides are to be attached to the cover 13, as is illustrated in FIG. 5, mountings for these attachments, for example, threaded bushings 52, can be embedded directly in the peripheral foam 20. The threaded bushing 52 was inserted into the foaming tool at the same time that the pane 14 was being foamed in place, without the necessity of additional mounting steps.

Figure 6:
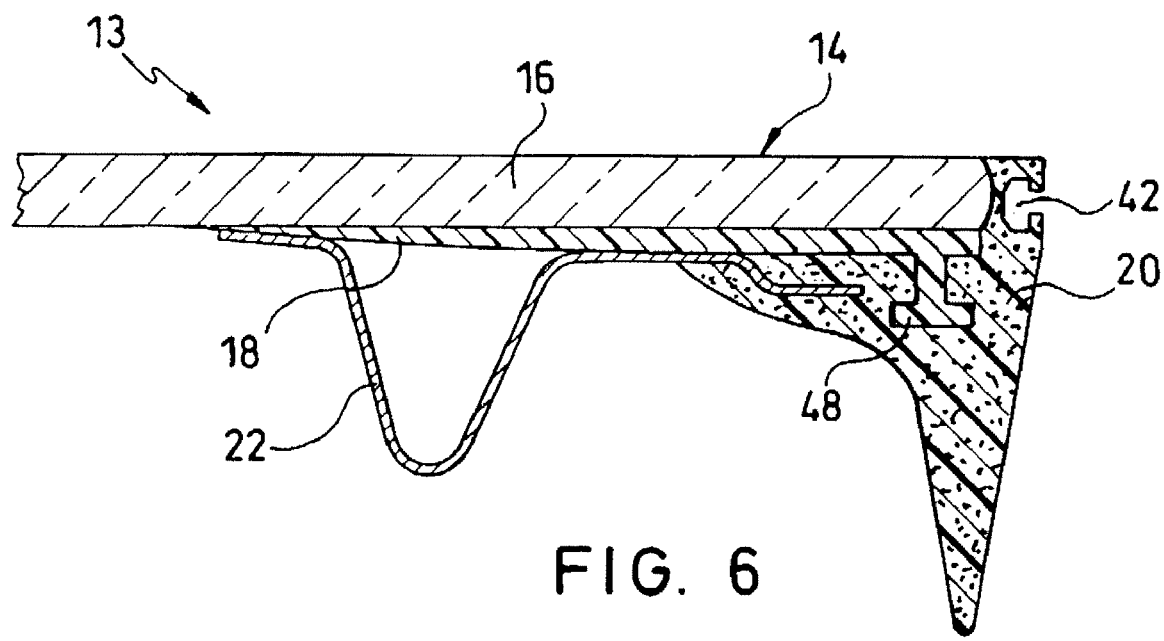

FIG. 6 shows another embodiment of the cover 13 in which the transparent pane 16 is made as a pane with an essentially uniform thickness, but in which the area 18 of opaque material molded in one piece onto the bottom has a T-shaped projection 48 which is embedded in the PU foam material 20. Furthermore, FIG. 6 shows an embodiment of the cover in which there is a receiver 42 in a lateral face of the peripheral foam 20 in order to attach a sealing element (not shown) to the cover as is known. These receivers, by means of which attachments such as seals, screens, etc. can be attached to the cover, can be molded in anywhere on the peripheral foam 20.

Figure 7:
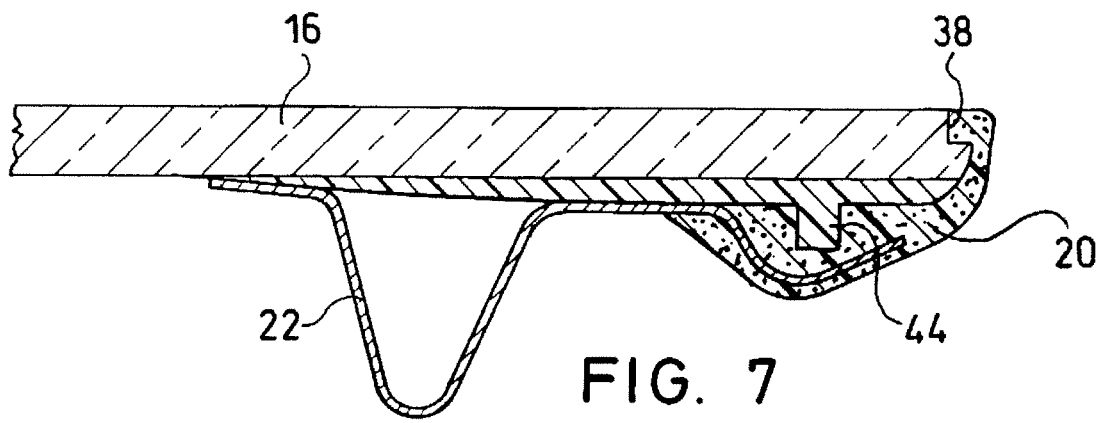
Figure 8:
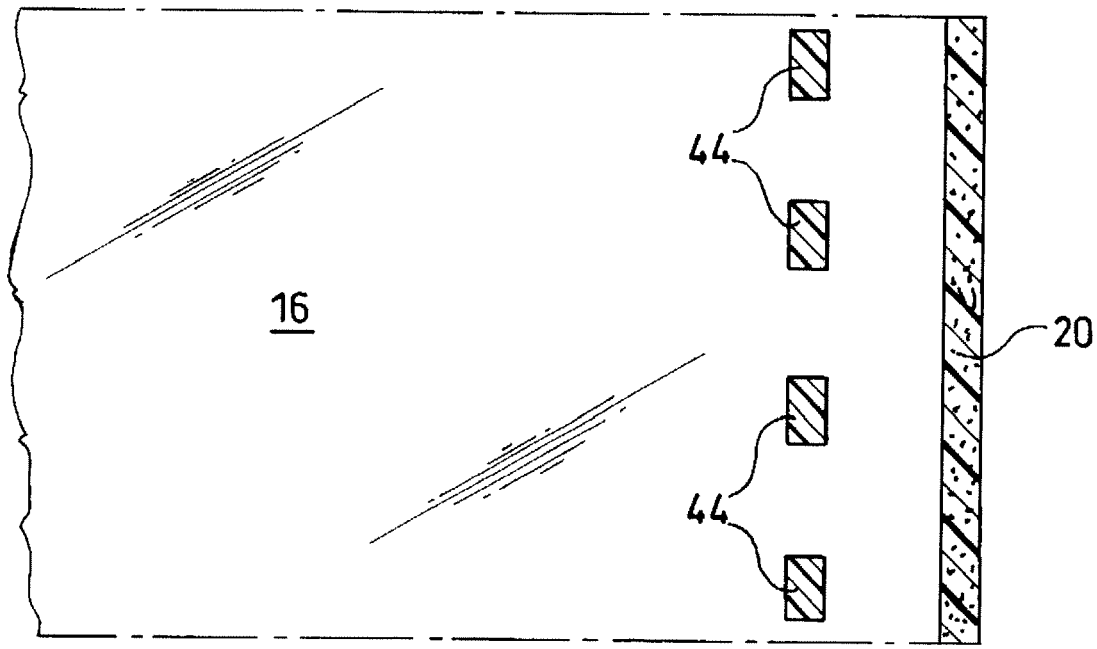
FIG. 8 is a top plan view of the cover shown in FIG. 7.

FIGS. 7 & 8 show a configuration of the cover 13 in which the positive interlocking between the pane 14 and the peripheral foam 20 is accomplished by a chamfer 38 which runs along the upper outside edge of the transparent pane 16, and by a plurality of elevations 44 which are provided on the bottom of the pane 14 in its opaque area. As is shown in FIG. 8, in this connection the elevations 44 can be arranged in a row in succession with a uniform distance between each other and with respect to the side edge of the pane.

Figure 9:
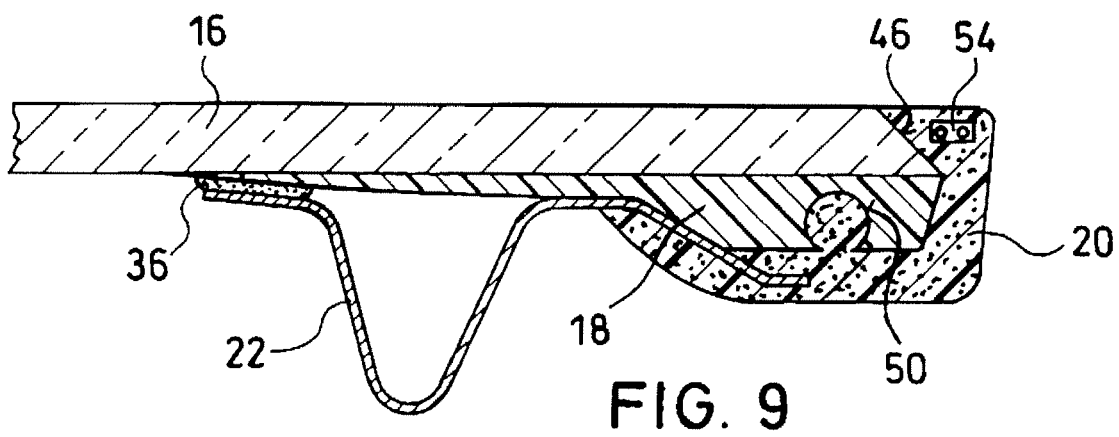
FIG. 9 is a view similar to FIG. 2 of another modified embodiment.

Two other measures for making providing a positive interlocking of the peripheral foam 20 and the pane 14 are shown in FIG. 9. In particular, in this connection, the upper side edge of the pane 14 is beveled in its transparent region 16, the pane in the area of the bevel 46 being encompassed by the foam material 20. Furthermore, on the bottom of the pane, there is a recess 50 within the opaque region with an inside cross section which is larger than its opening cross section and which is filled with foam material when the pane is foamed in place. It goes without saying that the recess 50 need not be located only within the opaque region, as in the illustrated example, but, since the pane 14 formed from the transparent pane 16 and the opaque 18 region forms an integral, one-piece component, can also extend into the transparent region 16. FIG. 9 also shows an embodiment of a cover 13 in which an attachment, here an antenna 54, is embedded directly into the peripheral foam 20. Because the antenna 54 is inserted easily into the foaming tool at the same time as the pane 14 is foamed in place, additional installation steps are eliminated.

Besides the above explained versions, numerous other shaping versions are possible, by means of which provision can be made for positive interlocking between the pane and the peripheral foam which then keeps the pane itself fixed on the peripheral foam in all three-dimensional directions when the pane is exposed to repeated high mechanical and thermal stresses. The above described measures can be combined with one another as desired in this connection.

What is claimed is:

1. Motor vehicle roof, comprising:
a fixed roof surface with a roof opening located therein, and
a cover for closing the roof opening, the cover having an at least partially transparent pane and a frame connected to the pane which extends over at least a part of an edge of the pane,
wherein the pane is a plastic pane and the frame is a peripheral foam that has been formed on the pane in situ,
wherein the shape of the pane in at least a portion of a connecting region between the pane and the peripheral foam has a configuration which produces a permanent mechanical connection between the pane and the peripheral foam by means of positive interlocking of the foam and the configuration,
wherein the pane has a integral construction formed of an essentially transparent pane and an essentially opaque plastic layer which has been molded on a peripheral bottom side area of the transparent pane, and
wherein the configuration which produces a permanent mechanical connection between the pane and the peripheral foam includes edge and bottom side areas of the opaque plastic and at least a peripheral edge of the transparent pane.

2. Vehicle roof, comprising:
a fixed roof surface with a roof opening located therein, and
a cover for closing the roof opening, the cover having an at least partially transparent pane and a frame connected to the pane which extends over at least a part of an edge of the pane,
wherein the pane is a plastic pane and the frame is a peripheral foam that has been formed on the pane in situ,
wherein the shape of the pane in at least a portion of a connecting region between the pane and the peripheral foam has a configuration which produces a permanent mechanical connection between the pane and the peripheral foam by means of positive interlocking of the foam and the configuration, wherein the pane has at least one recess which is disposed in a major surface of the cover at a location spaced from the edge of the pane and which is engaged by the peripheral foam.

3. Vehicle roof in accordance with claim 2, wherein the shape of the recess is chosen such that the peripheral foam extends behind it.

4. Vehicle roof in accordance with claim 1, wherein the pane has at least one elevation on a bottom side of the pane which is embedded in the peripheral foam.

5. Vehicle roof in accordance with claim 1, wherein the pane has at least one projection which is embedded in the peripheral foam.

6. Vehicle roof in accordance with claim 5, wherein the projection has portion extending parallel to the cover and the peripheral foam extends from below the portion to above it.

7. Vehicle roof in accordance with claim 1, wherein the pane has an undercut along at least part of a side edge thereof into which the peripheral foam extends.

8. Vehicle roof in accordance with claim 1, wherein the pane has a reduced cross section in part of a side edge thereof, said part of the side edge being encompassed by the peripheral foam.

9. Vehicle roof in accordance with claim 8, wherein the pane has one of a chamfer, a depression and a bevel in the part of the part of the side edge which is encompassed by the peripheral foam.

10. Vehicle roof in accordance with claim 1, wherein said permanent mechanical connection is provided between the pane and the peripheral foam by a positive interlocking geometry which extends essentially along the entire side edge of the pane.

11. Vehicle roof in accordance with claim 2, wherein the pane has an essentially transparent inner region and an essentially opaque edge area.

12. Vehicle roof in accordance with claim 11, wherein the essentially opaque edge area is integrally joined with the essentially transparent inner region.

13. Vehicle roof in accordance with claim 1, wherein the essentially opaque plastic layer is molded onto the bottom of the transparent pane.

14. Vehicle roof in accordance with claim 1, wherein the pane is formed of an essentially transparent polycarbonate material and the essentially opaque plastic layer is formed of an essentially opaque polycarbonate material.

15. Vehicle roof in accordance with claim 1, wherein a reinforcing frame extends into the peripheral foam.

16. Vehicle roof in accordance with claim 15, wherein the reinforcing frame is an inside metal cover sheet.

17. Vehicle roof in accordance with claim 16, wherein an outside edge of the inside metal cover sheet is embedded in the peripheral foam and an inside edge of the inside metal cover sheet rests against the bottom of the pane.

18. Vehicle roof in accordance with claim 16, wherein an outside edge of the inside metal cover sheet is embedded in the peripheral foam and wherein a damping layer is provided between an inner edge area of the inside metal cover sheet and the pane.

19. Vehicle roof in accordance with claim 1, wherein attachments are embedded in the peripheral foam.

20. Vehicle roof in accordance with claim 1, wherein mountings for mounting attachments are embedded into the peripheral foam.

21. Vehicle roof in accordance with claim 1, wherein receivers for mounting the attachments are molded into the peripheral foam.

22. Vehicle roof in accordance with claim 1, wherein the peripheral foam is made of a polyurethane material.

* * * * *